US005941162A

United States Patent [19]

Kiesel

[11] Patent Number: 5,941,162

[45] Date of Patent: Aug. 24, 1999

[54] PISTON

[75] Inventor: Mark J. Kiesel, Peoria, Ill.

[73] Assignee: Caterpillar Inc., Peoria, Ill.

[21] Appl. No.: 08/997,420

[22] Filed: Dec. 23, 1997

[51] Int. Cl.[6] .................... F16J 9/00

[52] U.S. Cl. .................... 92/245; 92/254; 92/258

[58] Field of Search .................... 92/241, 245, 194, 92/249, 254, 258

[56] References Cited

U.S. PATENT DOCUMENTS

| | | | |
|---|---|---|---|
| 2,429,426 | 10/1947 | Phillips et al. | 92/249 |
| 2,664,163 | 12/1953 | Schnitter | 92/249 |
| 2,911,270 | 11/1959 | White | 92/244 |
| 3,867,871 | 2/1975 | Shore | 92/258 |
| 4,762,052 | 8/1988 | Stoll et al. . | |
| 4,831,916 | 5/1989 | Leigh-Monstevens et al. . | |
| 4,898,082 | 2/1990 | Pottorff | 92/248 |

FOREIGN PATENT DOCUMENTS

| | | | |
|---|---|---|---|
| 1107647 | 3/1968 | United Kingdom | 92/249 |
| 2222213 | 2/1990 | United Kingdom . | |

OTHER PUBLICATIONS

"Reinforced Plastics" in Encyclopedia of Polymer Science and Engineering (New York, John Wiley and Sons, 1988), pp. 327–333.

*Primary Examiner*—F. Daniel Lopez
*Attorney, Agent, or Firm*—Calvin E. Glastetter

[57] ABSTRACT

A piston having a body member made from plastic material adapted for mounting to a piston rod for axial movement with the piston rod in a hydraulic cylinder under high working pressure conditions is disclosed. The plastic piston body member has a first axial end portion, an opposite second axial end portion, an outer circumferential surface portion adapted to be located in intimate relation with a cylinder wall of the hydraulic cylinder when the piston is positioned for axial movement therein, and an inner peripheral surface portion defining a centrally located axially extending aperture through the body member adapted for cooperatively receiving a mounting portion of the piston rod, one of the axial end portions being positioned to abut an adjacent shoulder of the piston rod when the mounting portion of the piston rod is located in a fully received position in the aperture. When the mounting portion of the piston rod is in the fully received position in the aperture of the body member, the inner peripheral surface portion of the body member is adapted to be located in intimate relation with an outer mounting surface of the mounting portion, and the body member is cooperatively engageable with a retainer for securing the body member to the piston rod.

1 Claim, 4 Drawing Sheets

PISTON

TECHNICAL FIELD

This invention relates generally to pistons adapted for reciprocal axial operation in hydraulic cylinders, and, more particularly, to pistons made from plastic materials suitable for use in hydraulic cylinders under high working pressure conditions and conditions typical of hydraulic systems for tractors, construction, mining, earth moving equipment, and the like.

BACKGROUND ART

Currently, known pistons used in hydraulic cylinders for tractors, construction, mining, earth moving equipment, and the like, are made from high strength or hardened metallic materials. One reason for this is that those materials are able to withstand the compressive stress conditions acting on the pistons caused by high torque on the nuts and/or bolts used to fasten the pistons to piston rods for axial movement in the hydraulic cylinders. High strength or hardened metallic materials are also used because they are able to withstand the high pressure working conditions. However, a disadvantage of high strength and hardened metallic materials is that they are costly, due both to the cost of the metallic materials themselves, and the cost of machining and finishing the metallic pistons. Also, the fasteners used for fastening the pistons to the piston rods are typically required to be tightened to high torque levels, necessitating special tools for that purpose.

Reference Stoll et al. U.S. Pat. No. 4,762,052, issued Aug. 9, 1988; Leigh-Monstevens et al. U.S. Pat. No. 4,831,916, issued May 23, 1989; and Reinartz et al. GB 2222213, published Feb. 28, 1990, which disclose various piston constructions made at least substantially from plastic materials. However, U.S. Pat. No. 4,762,052 and U.S. Pat. No. 4,831,916, disclose piston constructions which still require metallic members at some locations thereon. GB 2222213 discloses a master cylinder and piston operable therein made from plastic, but which is used in a relatively low pressure, low torque application for actuation of an automotive clutch.

Accordingly, the present invention is directed to overcoming one or more of the problems as set forth above.

DISCLOSURE OF THE INVENTION

In one embodiment of the present invention a piston having a body member made from plastic material adapted for mounting to a piston rod for axial movement with the piston rod in a hydraulic cylinder under high working pressure and torque conditions is disclosed. The plastic piston body member has a first axial end portion, an opposite second axial end portion, an outer circumferential surface portion adapted to be located in intimate relation with a cylinder wall of the hydraulic cylinder when the piston is positioned for axial movement therein, and an inner peripheral surface portion defining a centrally located axially extending aperture through the body member adapted for cooperatively receiving a mounting portion of the piston rod, one of the axial end portions being positioned to abut an adjacent shoulder of the piston rod when the mounting portion of the piston rod is located in a fully received position in the aperture. Additionally, when the mounting portion of the piston rod is in the fully received position in the aperture of the body member, the inner peripheral surface portion of the body member is adapted to be located in intimate relation with an outer mounting surface of the mounting portion, and the body member is cooperatively engageable with a retainer for securing the body member to the piston rod.

According to a preferred aspect of the invention, the retainer is a split ring assembly cooperatively engageable with the piston body member using conventional threaded fasteners tightenable using hand tools, the split ring assembly having an inner peripheral edge portion cooperatively receivable in a groove around the piston rod for retaining the piston rod mounting portion in the aperture of the piston body member.

According to several other preferred aspects of the invention, the piston body member can have a frusto-conical outer circumferential surface portion; one or both of the axial end portions of the piston body member can have annular cavities therein to reduce the amount of plastic material required to make the body member, which cavities can be ribbed for strength; and one or more additional body members can be mounted to the piston rod in end-to-end relation to provide a bi-directional operability. Additionally, one or more elastomeric seal members such as an O-ring or the like can be optionally located between the piston rod and the piston body member or members to prevent leakage therebetween.

Preferred plastic materials for the piston body member include, but are not limited to, engineered plastic materials such as glass filled nylons and the like, which materials can be formed to shape using gas assisted or structural foam injection molding and other suitable processes.

Additional advantages achieved with the present piston construction include reduced materials costs due to the ability to use plastic for the piston body member and conventional fasteners; reduced manufacturing costs compared to those for machined high strength or hardenable metallic pistons; and reduced assembly costs due to the ability to secure the piston to the piston rod using hand tools.

BEST MODE FOR CARRYING OUT THE INVENTION

Figure 1:
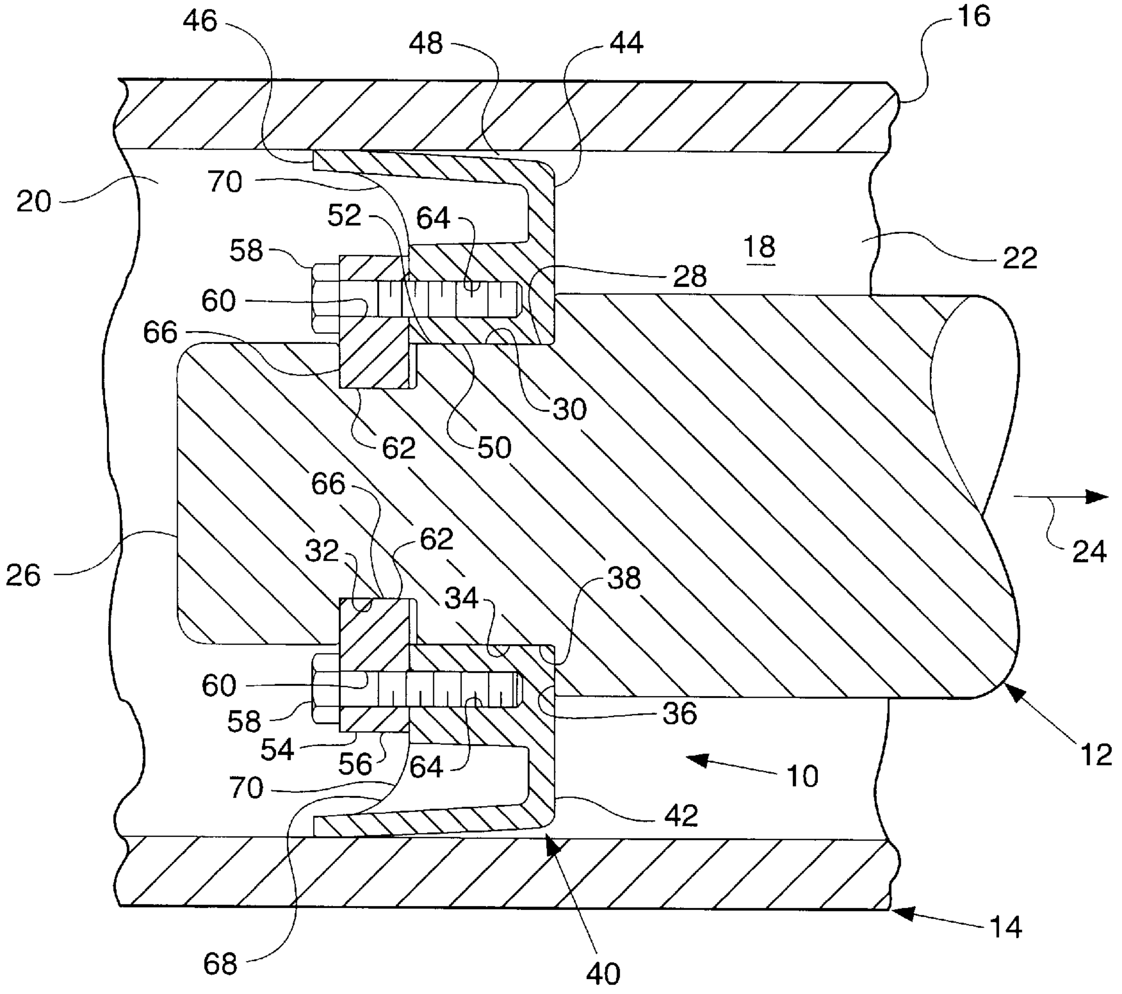
FIG. 1 is a fragmentary cross sectional view of a piston assembly according to the present invention, shown mounted to a piston rod axially movable in a hydraulic cylinder.

Referring to the drawings, FIG. 1 shows a piston assembly 10 constructed and operable in accordance with the teachings of the present invention securely mounted in operable position to a piston rod 12 positioned for axial movement in a hydraulic cylinder 14. Hydraulic cylinder 14 is representative of a wide variety of hydraulic cylinders used on tractors, construction, mining, and earthmoving equipment, under high hydraulic working pressure conditions. Hydraulic cylinder 14 is a single action hydraulic cylinder which includes an elongated, tubular cylinder wall 16 defining a bore 18, bore 18 having a first bore portion 20 on one side of piston assembly 10 containing hydraulic fluid (not shown), and a second bore portion 22 on the opposite side of piston assembly 10 which contains little or no hydraulic fluid, the hydraulic fluid in first bore portion 20 being pressurizable using conventional means to act against piston assembly 10 to move piston assembly 10 and piston rod 12 axially in bore 18 in the direction denoted by arrow 24 in the conventional manner.

Piston rod 12 is an elongated member having an end portion 26 including a mounting portion 28 having a circumferential outer surface 30 adapted for cooperatively receiving and supporting piston assembly 10, a circumferential groove 32 being located adjacent a first axial end 34 of mounting portion 28, and a circumferential axially facing shoulder 36 being located adjacent a second axial end 38 of mounting portion 28.

Figure 2:
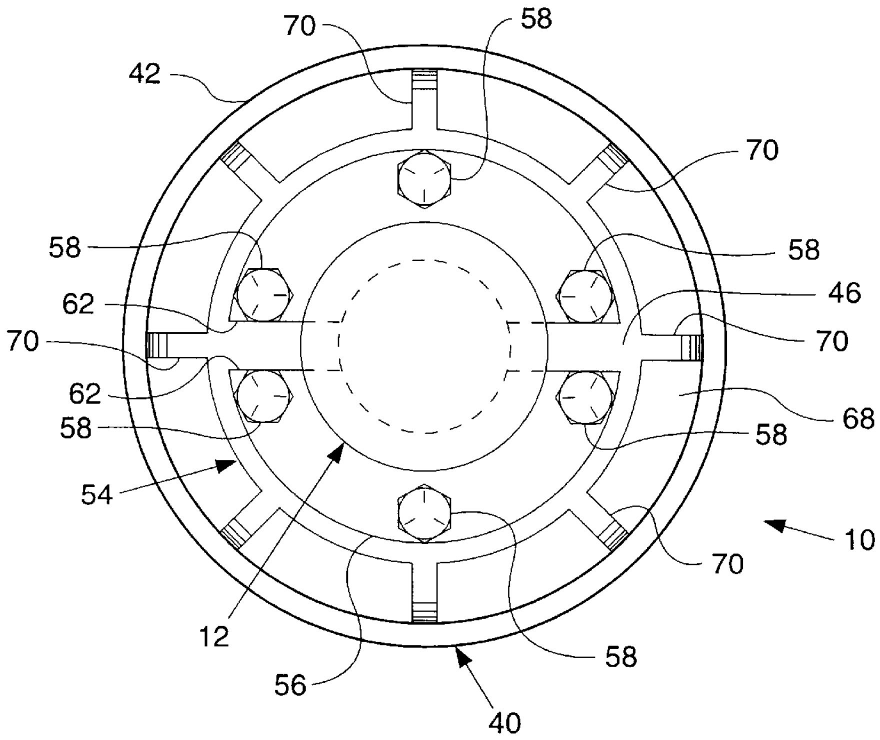
FIG. 2 is an end view of the piston assembly and piston rod of FIG. 1.
Figure 3:
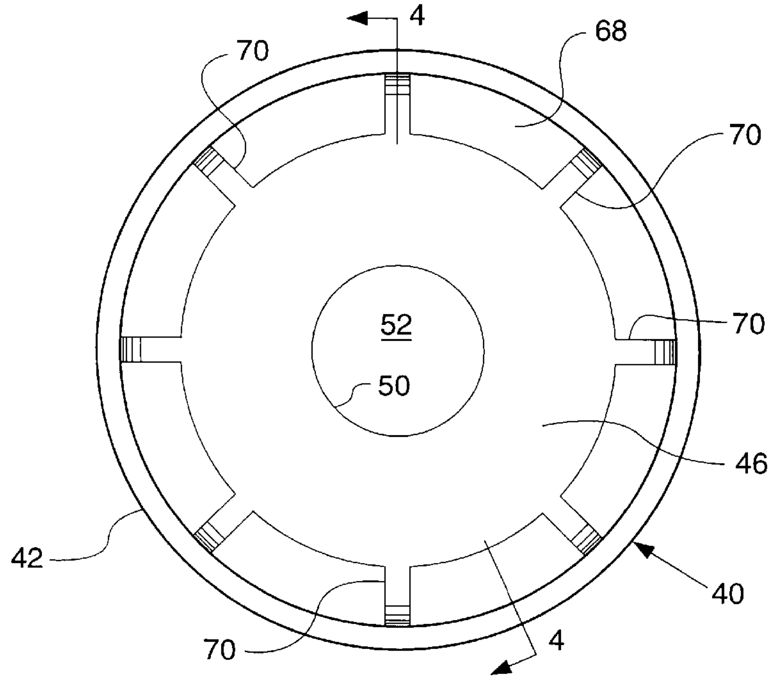
FIG. 3 is an end view of a piston of the piston assembly of FIG. 1.

Referring also to FIG. 2, piston assembly 10 includes a piston 40 having an annular piston body member 42 made from plastic material. Body member 42 includes a first axial end portion 44, an opposite second axial end portion 46, an outer circumferential surface portion 48 extending between first axial end portion 44 and second axial end portion 46, and an inner peripheral surface portion 50 defining an axially extending aperture 52 through piston body member 42, as best shown in FIG. 3. Importantly, piston 40 is shown in FIG. 1 mounted to piston rod 12 with outer surface 30 of mounting portion 28 of piston rod 12 in a fully received position in aperture 52 wherein first axial end portion 44 of piston body member 42 is located in substantial abutment with shoulder 36 of piston rod 12, and inner peripheral surface portion 50 in intimate relation with outer surface 30. Piston 40 is maintained in this position by a retainer 54 which preferably comprises a split ring assembly 56 fastened to piston body member 42 and cooperatively received in groove 32 of piston rod 12. The preferred split ring assembly 56 includes threaded fasteners 58 which extend through holes 60 extending through arcuate shaped ring segment members 62 and threadedly engage threaded holes 64 in piston body member 42 at angularly spaced locations therearound. For cooperative engagement with piston rod 12, each ring segment member 62 has an inner peripheral edge portion 66 cooperatively receivable in groove 32 and engageable with piston rod 12 therein. Here, it should be noted that ring segment members 62 are preferably made of metallic material, and the above described manner of mounting piston assembly 10 to piston rod 12 can be accomplished using threaded fasteners 58 which are of conventional metallic construction and which can be threadedly engaged with the piston body member 42 using torque levels achievable with hand tools, the mounted piston assembly 10 including plastic piston 40, being able to withstand high loading conditions typically encountered in tractor, construction, mining, and earthmoving applications.

Outer circumferential surface portion 48 of piston body member 42 preferably has a frusto-conical shape which extends convergingly towards first axial end portion 44 of piston body member 42. Outer circumferential surface portion 48 is adapted to be located in intimate relation with cylinder wall 16 when piston rod 12 and piston assembly 10 are operably positioned in bore 18, for forming a sealed condition around piston assembly 10. Additionally, piston body member 42 preferably includes an annular cavity 68 therearound, which cavity 68 is open to second axial end portion 46 and includes a plurality of ribs 70 extending radially thereacross at angularly spaced locations therearound, as best shown in FIG. 2. The presence of annular cavity 68 in piston body member 42 serves to reduce the amount of plastic material required to make piston body member 42, ribs 70 providing the required strength to enable piston body member 42 to resist failure under high pressure and loading conditions. Additionally, annular cavity 68 is open to first bore portion 20 of bore 18 which contains the pressurized hydraulic fluid (not shown) during operation. This enables the pressurized hydraulic fluid to enter annular cavity 68 and act to urge outer circumferential surface portion 48 radially outwardly to improve and increase the sealed condition formed between surface portion 48 and cylinder wall 16 around piston 40.

FIG. 3 is an end view of piston 40 showing aperture 52 formed through body member 42 by inner peripheral surface portion 50; second axial end portion 46; annular cavity 68; and ribs 70 extending across cavity 68.

Figure 4:
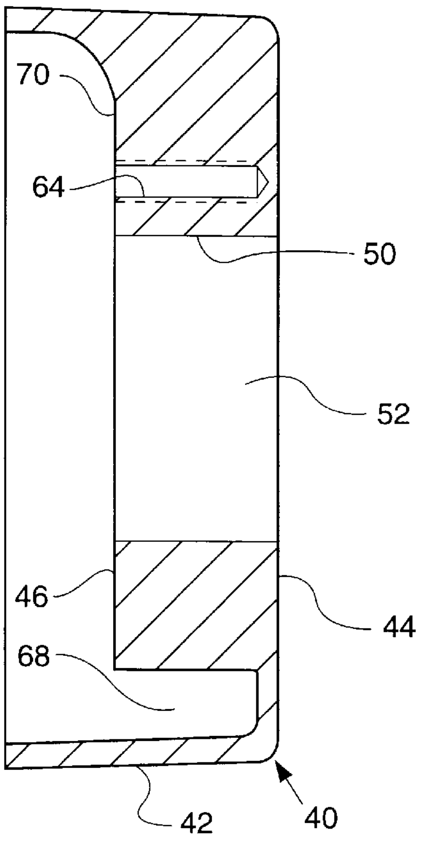
FIG. 4 is a cross sectional view of the piston taken along line 4—4 of FIG. 3.

FIG. 4 is a cross sectional view of piston 40 which also shows inner peripheral surface portion 50 and aperture 52 extending between first axial end portion 44 and second axial end portion 46 of piston body member 42, along with one of the threaded holes 64, cavity 68, and a rib 70.

Figure 5:
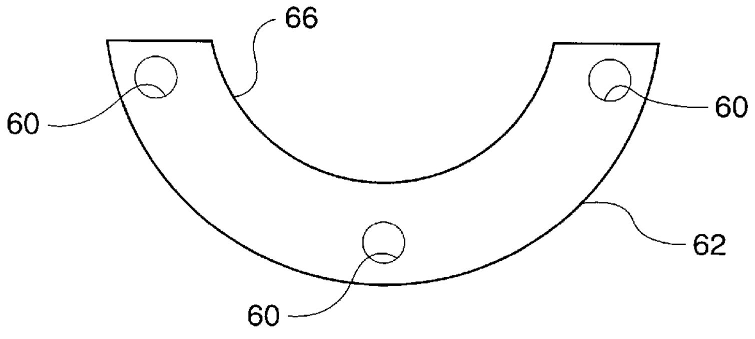
FIG. 5 is an end view of a ring segment member of the piston assembly of FIG. 1.

FIG. 5 is an end view of a ring segment member 62, showing holes 60 therethrough and inner peripheral edge portion 66.

Figure 6:
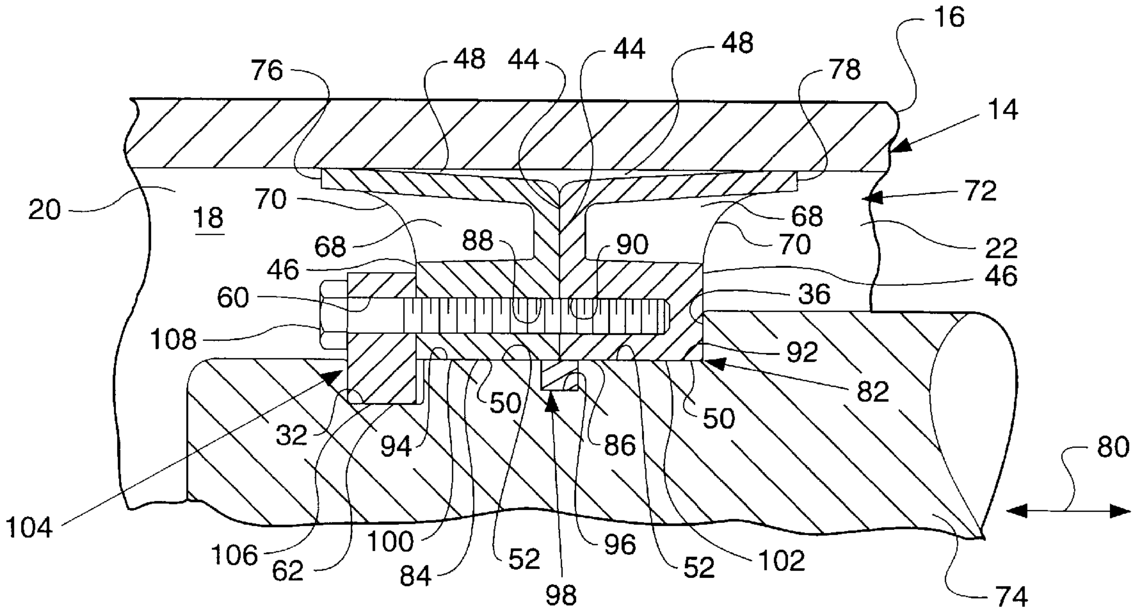
FIG. 6 is a fragmentary cross-sectional view of a second piston assembly according to the present invention, shown mounted to a piston rod for axial movement in the hydraulic cylinder of FIG. 1.

FIG. 6 shows another piston assembly 72 constructed and operable according to the present invention, which piston assembly 72 is mounted to a piston rod 74 for axial movement in a bore 18 defined by a cylinder wall 16 of a hydraulic cylinder 14, as discussed above. Piston assembly 72 differs from piston assembly 10 discussed above in that piston assembly 72 is a double acting piston assembly, as opposed to a single acting piston assembly as in the case of piston assembly 10. That is, pressurized hydraulic fluid (not shown) in either a first bore portion 20 or a second bore portion 22, adjacent axial end portion 76 or axial end portion 78 of piston assembly 72, respectively, is operable to urge piston assembly 72 and piston rod 74 in a corresponding axial direction in bore 18, as denoted by the arrow 80. Piston assembly 72 includes a piston 82 including a first piston body member 84 located in axially opposed relation to a second piston body member 86, both first piston body member 84 and second piston body member 86 being constructed of plastic material similarly to piston body member 42 discussed above, including a first axial end portion 44, an opposite second axial end portion 46, an outer circumferential surface portion 48, and an inner peripheral surface portion 50 defining a central aperture 52 therethrough, as well as a cavity 68 having a plurality of ribs 70 thereacross.

First piston body member 84 differs from piston body member 42 discussed above in the provision of a plurality of axially extending holes 88 therethrough instead of threaded holes 64. Second piston body member 86 differs from piston body member 42 in the provision of a plurality of threaded holes 90 therein, which holes 90 extend from first axial end portion 44 instead of second axial end portion 46 as in the case of piston body member 42. As previously noted, first piston body member 84 and second piston body member 86 are located in opposed relation, more particularly, first axial end portion 44 of first piston body member 84 being located in abutting relation to first axial end portion 44 of second piston body member 86. Alternately, the Piston rod 74 includes a mounting portion 92 having a circumferential outer surface 94 including a circumferential groove 96 therein, groove 96 containing an O-ring 98 for forming a circumferentially sealed condition between piston assembly 72 and piston rod 74. Alternately, the circumferential groove 96 may be disposed within the inner peripheral surface portion 50 of the piston assembly 72. Piston rod 74 further includes a circumferential groove 32 therein adjacent a first axial end 100 of outer surface 94, and an axially facing circumferential shoulder 36 located adjacent to a second axial end of outer surface 94. Piston assembly 72 is mountable to piston rod 74 as shown with outer surface 94 of mounting portion 92 of piston rod 74 in a fully received position in both aperture 52 of first piston body member 84 and aperture 52 of second piston body member 86, and second axial end portion 46 of second piston body member 86 in abutment with shoulder 36. Piston assembly 72 is secured in this mounted position to piston rod 74 with a retainer 104 which is preferably a split ring assembly 106 including metallic ring segment members 62 having holes 60 therethrough for receiving threaded fasteners 108 of the assembly 106 which pass through holes 88 of first piston body member 84 and threadedly engage threaded holes 90 of second piston body member 86.

Briefly, piston assembly 72 is operable in association with piston rod 74 to move axially as denoted by the arrow 80 in bore 18 of hydraulic cylinder 14 under pressure exerted against either second axial end portion 46 of first piston body member 84 or second axial end portion 46 of second piston body member 86 by hydraulic fluid (not shown) located in bore 18. Again, like with piston assembly 10, hydraulic fluid can enter cavity 68 of first piston body member 84 or cavity 68 of second piston body member 86 to urge the respective outer circumferential surface portion 48 thereof into better sealed relation with cylinder wall 16. Also, due to the construction of piston assembly 72, when mounting piston assembly 72 on piston rod 74, threaded fasteners 108 can be fastened to piston assembly 72 using lower amounts of torque achievable using hand tools, while still being able to withstand high loading conditions and high pressure conditions typically encountered in hydraulic cylinder applications for tractors, construction equipment, mining equipment and the like.

INDUSTRIAL APPLICABILITY

The present piston has applicability for a wide variety of hydraulic cylinders and like applications, wherein high working pressure conditions are encountered, such as in hydraulic cylinders for tractors, construction, mining, earth moving equipment, and the like. Other aspects, objects and advantages of the present invention can be obtained from a study of the drawings, the disclosure and the appended claims.

I claim:

1. A piston mountable to a piston rod for axial movement with the piston rod in a hydraulic cylinder, the piston rod having a piston mounting portion including an outer mounting surface and a adjacent axial facing shoulder, the piston comprising:

an annular body member having a plurality of radially extending ribs spanning an annular cavity, wherein the body member is made from a glass filled nylon material having a first axial end portion, and opposite second axial end portion, an outer frusto-conical circumferential surface portion adapted to be located in intimate relation with the cylinder wall of the hydraulic cylinder when the piston is positioned for axial movement therein, and an inner peripheral surface portion defining a centrally located axially extending aperture through the body member adapted for cooperatively receiving the mounting portion of the piston rod, one the axial end portions being positioned to abut the shoulder of the piston rod when the mounting portion of the piston rod is located in a fully received position in the aperture, the inner peripheral surface portion being adapted to be located in intimate relation with the outer mounting surface of the mounting portion when the mounting portion is in the fully received position in the aperture and the body member being cooperatively engageable with the retainer for securing the body member to the piston rod with the mounting portion of the piston rod in the fully received position in the aperture.

* * * * *